W. J. ELSOM.

Fifth-Wheel for Vehicles.

No. 7,977. Reissued Dec. 4, 1877.

WITNESSES

A Scott

W. A. Redmond

INVENTOR

Wm. J. Elsom.

by Suggett & Nottingham

ATTORNEYS.

N. PETERS, PHOTO-LITHOGRAPHER, WASHINGTON, D. C.

UNITED STATES PATENT OFFICE.

WILLIAM J. ELSOM, OF CORTLAND, NEW YORK.

IMPROVEMENT IN FIFTH-WHEELS FOR VEHICLES.

Specification forming part of Letters Patent No. 195,754, dated October 2, 1877; Reissue No. 7,977, dated December 4, 1877; application filed November 26, 1877.

*To all whom it may concern:*

Be it known that I, WILLIAM JACKSON ELSOM, of the village of Cortland, in the county of Cortland and State of New York, have invented a new and useful Improvement in Fifth-Wheels for Wagons, which improvement is fully set forth in the following specification, reference being had to the accompanying drawings, and to the figures and letters of reference marked thereon, in which drawings—

Figure 1:
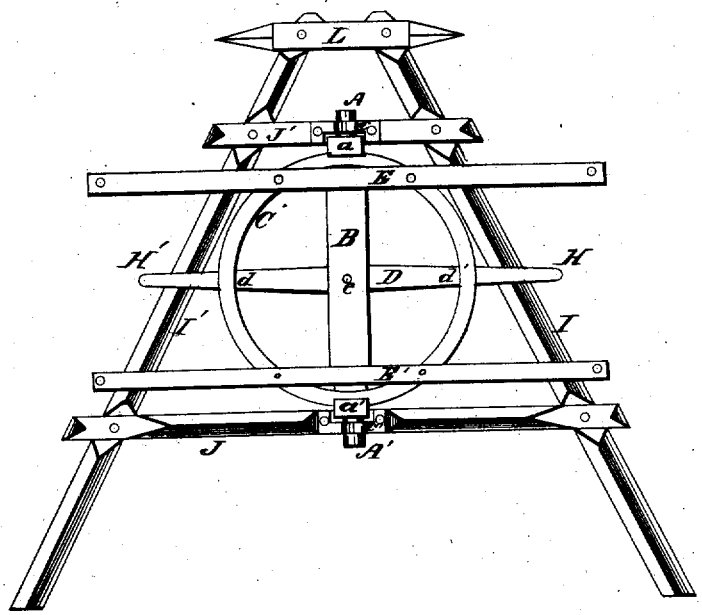
Figure 2:
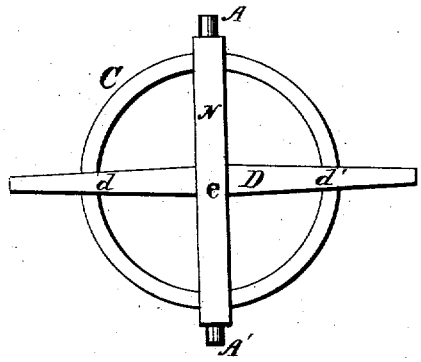
Figure 3:
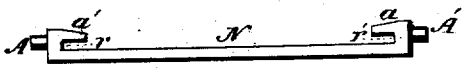

Figure 1 shows a top view of the said fifth-wheel, and the frame-work upon which it rests, and the frame-work surrounding the same, and their appendages. Fig. 2 shows the construction and arrangement of the under side of the frame-work supporting the said fifth-wheel. Fig. 3 shows a side view of the rock-shaft upon which the said fifth-wheel works, and of the projecting lugs which retain the said fifth-wheel on the said rock-shaft.

In the drawings the same letters on the different figures indicate like parts.

The object of my invention is to relieve the strains, binding, and jarring noticed in the ordinary fifth-wheels when the wagon upon which they are used is run upon rough or uneven ground, and also in turning and cramping; and my invention consists in placing the said fifth-wheel upon a rock-shaft, so that it can oscillate or rock between certain limits.

In Fig. 1, C is the fifth-wheel, which rests and turns upon the rock-shaft N, Fig. 2, which shaft is placed at right angles to the axle-tree of the wagon, and rocks or oscillates on the journals A and A′ in the journal-boxes *c* and *c′*, which rest on the cross-bars J and J′. Said cross-bars, together with the pieces I and I′ and L, make up the frame-work, to which the springs and thills or pole of an ordinary platform spring-wagon are attached. On the top of said fifth-wheel C, and fastened to it, is the frame-work (shown at E, E′, and B) to which the wagon-box is fastened. Through the center of B the king-bolt *e* passes, so that the said fifth-wheel and the frame-work thereon can turn around with the said king-bolt as a center. At right angles to and in the same horizontal plane as the upper side of the said rock-shaft N is placed the projecting bar D, as shown in Fig. 2, the under side of the fifth-wheel C resting on the same, as shown at *d* and *d′*, Figs. 1 and 2. This bar D extends out far enough so that each end of the same projects over and beyond the pieces I and I′, as shown at H and H′. The object of this construction will be seen hereinafter.

In Figs. 1 and 3, *a* and *a′* represent projecting lugs, under and through which, at *r* and *r′*, the said fifth-wheel passes and is retained therein, the cross-pieces J and J′ being above the pieces I and I′, thus making the horizontal plane of the bar D above that of the pieces I and I′, so that the rock-shaft N can oscillate the ends H and H′ of D, thus rising and falling until stopped by striking I and I′. The distance through which the said bar D can thus rise and fall may be increased or diminished by making the cross-pieces J and J′ thicker or thinner, so as to raise or lower the said rock-shaft, as desired.

In Fig. 3 it will be noticed that the journals A and A′ are above the horizontal plane of the under side of the fifth-wheel when it rests on the said rock-shaft, the object of this construction being to produce uniform and steady motion, this construction being an important feature of said rock-shaft.

Having thus described the construction of my oscillating fifth-wheel and its necessary appendages, I will now proceed to describe its operation. The box of the wagon being properly placed on the hind springs and the frame-work E and E′, when the wagon is run over rough or uneven ground, or is turned or cramped, the forward wheels can rise and fall as far as the rod D and the pieces I and I′ will permit, and by making the horizontal plane of the under side of D four or five inches above I and I′, ordinary stones and obstacles will be easily and readily passed over without any binding or jarring whatever.

It will thus be seen that the said rock-shaft N permits either one of the forward wheels to rise or fall, so as to pass over an ordinary obstacle, and also to turn and cramp, and no strain, binding, or jarring takes place.

It is also evident that the fifth-wheel C need not consist of one piece or circular rim, as shown; but a great many of the varieties of fifth-wheels now in use may be applied to and placed on the rock-shaft N and projecting bar D.

Having thus described my invention, what I claim, and desire to secure by Letters Patent, is—

1. The herein-described rock-shaft N, with the lugs *a a'* and journals A and A' thereon, and the cross-bar D thereto attached, all made and operated substantially in the manner and for the purposes herein shown and specified.

2. The combination and arrangement of the said rock-shaft N, lugs *a* and *a'*, journals A and A', journal-boxes *c* and *c'*, fifth-wheel C, cross-pieces J and J', pieces L and I and I', and cross-bar D, all made, combined, and operated substantially in the manner and for the purposes herein described and shown.

WILLIAM JACKSON ELSOM.

Witnesses:
WILLIAM D. TUTTLE,
H. J. HARRINGTON.